United States Patent [19]

Lee

[11] Patent Number: 5,052,272
[45] Date of Patent: Oct. 1, 1991

[54] LAUNCHING PROJECTILES WITH HYDROGEN GAS GENERATED FROM ALUMINUM FUEL POWDER/WATER REACTIONS

[75] Inventor: Woodrow W. Lee, Potomac, Md.

[73] Assignee: The United States of America as represented by the Secretary of the Navy, Washington, D.C.

[21] Appl. No.: 564,894

[22] Filed: Aug. 6, 1990

[51] Int. Cl.$^5$ .............................................. F41F 1/00
[52] U.S. Cl. .............................................. 89/7; 89/8
[58] Field of Search .......................................... 89/7, 8

[56] References Cited

U.S. PATENT DOCUMENTS

| | | | |
|---|---|---|---|
| 2,899,864 | 8/1959 | Bloxsom | 89/7 |
| 3,267,720 | 8/1966 | Escallier et al. | 73/147 |
| 4,658,699 | 4/1987 | Dahm | 89/8 |
| 4,895,062 | 1/1990 | Chryssomallis et al. | 89/7 |
| 4,974,487 | 12/1990 | Goldstein et al. | 89/7 |

OTHER PUBLICATIONS

Scherrer, Victor E., "An Exploding wire Hypervelocity Projector", *Exploding Wires II*, vol. II, ed. Chace et al, 1962, pp. 235–244.

Primary Examiner—David H. Brown
Attorney, Agent, or Firm—Kenneth E. Walden; Roger D. Johnson

[57] ABSTRACT

A method of propelling a projectile from a device by applying a high power pulse of electrical current to a thin metal conductor wire causing the wire to explode and disperse hot spots of molten metal throughout an aluminum fuel powder/water mixture which reacts to generate hydrogen gas at high pressure in a chamber. The hydrogen gas is used to push the projectile from the device.

23 Claims, 2 Drawing Sheets

LAUNCHING PROJECTILES WITH HYDROGEN GAS GENERATED FROM ALUMINUM FUEL POWDER/WATER REACTIONS

BACKGROUND OF THE INVENTION

This invention relates to methods of generating gases and more particularly to methods of generating hydrogen gas.

Acceleration of projectiles launched from gun, rocket, and missile systems is limited by the sonic velocity of gas products from propellants. Conventional gun propellants (nitrocellulose) generate heavy gases like carbon dioxide, carbon monoxide, nitrogen oxide, and water vapor whose sonic velocity seldom exceeds 500 m/sec at ambient temperature. The maximum speed of projectiles launched from gun barrel by such gases barely reaches 1 km/sec.

Hydrogen gas which outspeeds any other gases (under same pressure and temperature), owing to its low molecular weight, is an ideal fluid to impart its kinetic energy efficiently to a projectile. For this reason hydrogen gas is used in a two-stage gas gun (1) that launches a projectile to hypervelocity (over 6 km/sec). This type of gun is operated by a two step process. In the first stage, gun powder charge is ignited to drive a piston against hydrogen gas stored in a gas reservoir. In the next stage, the rise of hydrogen gas pressure due to the compression eventually actuates a valve mechanism at the base of the launch barrel and pressurized hydrogen is released to push a projectile. Besides this multi-staged pressurization, the whole operation of the device also includes storing of the gas nearby and mechanisms for its transfer to the reservoir. Although the staged gas gun routinely increases the projectile velocity up to 7 km/sec, the complexity of the operation makes it cumbersome and impractical for routine uses.

Hydrogen gas can be generated chemically in such reactions as decomposition of metal hydrides or oxidation of metal like aluminum by water. When metal hydride is mixed with a certain metal oxide, the decomposition of the hydride is greatly accelerated and the overall reaction accompanies a net energy gain. However, the amount of heat and gas generated per unit mass or volume of the reactants in the decomposition is not clearly advantageous over conventional propellants. Energetically, the reaction of aluminum with water is more favorable than combustion of the propellants. However, due to the formulation of passive oxide film on the metal surface, the oxidation reaction is never sustained unless the temperature of the metal is raised above the melting point of its oxide. Therefore, such metallic systems need to be activated energetically in order to generate hydrogen gas which is clearly more energetic than the gases from the conventional propellants, or to complete the hydrogen generating reaction.

Woodrow W. Lee and Richard D. Ford in U.S. Patent Application Ser. No. 07/199,879 filed on May 27, 1988 and titled, "Method for Launching Projectiles with Hydrogen Gas," disclose a method in which a high power pulse of electrical current is applied to a metal fuel element made of aluminum, an aluminum-lithium alloy, or an aluminummagnesium alloy in the form of a wire or a foil causing the metal fuel element to explode dispersing a mixture of vaporized and molten metal into water surrounding the metal fuel element. The dispersed fine metal particles react with the water generating hydrogen gas at high pressure. After the metal fuel element has exploded, the electrical current is continued in order to drive the reaction between the metal and water. After a preselected hydrogen pressure is achieved, the hydrogen gas is used to propel a projectile from a barrel.

The Lee et al. method described above has some drawbacks. First, energization (melting, vaporization and dispersion) of aluminum wire for its reaction with the surrounding water solely depends on electrical energy. Thus, it is a energy demanding process—about 10 KJ of electrical energy for 1 gm of aluminum. Second, the volume of water used in the above case is in far excess the stoichiometric amount in order to contain and to have surface contact with the exploded metal. This results in vaporization of the excess water that mixes with the hydrogen product gas to increase its weight.

SUMMARY OF THE INVENTION

Accordingly, an object of this invention is to provide a method of generating hydrogen gas with higher energy efficiency.

Another object of this invention is to provide a method of rapidly generating hydrogen gas at high pressure and temperature with fewer high molecular weight byproducts than existing methods.

A further object of this invention is to provide a method of keeping the aluminum fuel powder uniformly distributed throughout the water oxidizer in the fuel/oxidizer mixture.

Yet another object of this invention is to provide a method of launching projectiles at very high velocities.

A still further object of this invention is to provide a simple method of launching projectiles at high velocities with hydrogen gas.

These and other objects of this invention are accomplished by providing
a method of propelling a projectile from a device by
(1) applying a high power pulse of electrical current to a thin metal wire conductor which passes through a mixture of
  (a) an aluminum fuel powder which is
    (i) aluminum powder,
    (ii) an aluminum-lithium alloy powder, or
    (iii) an aluminum-magnesium alloy powder and
  (b) water,
  causing the thin metal wire conductor to explode forming hot spots of molten metal throughout the aluminum fuel powder/water mixture which initiate chemical reaction between the aluminum powder and water, lithium and water or magnesium and water which generate hydrogen gas at high pressure in a chamber;
(2) continuing to apply electrical energy to the reaction mixture to promote the reactions;
(3) allowing the hydrogen gas pressure build to a preselected level; and then
(4) using the hydrogen gas to push the projectile from the device.

BRIEF DESCRIPTION OF THE DRAWINGS

A more complete application of this invention, and many of the attendant advantages thereof, will become readily apparent as the same becomes better understood by reference to the following detailed description when considered in conjunction with the accompanying drawings, wherein.

DETAILED DESCRIPTION OF THE PREFERRED EMBODIMENT

Figure 1:
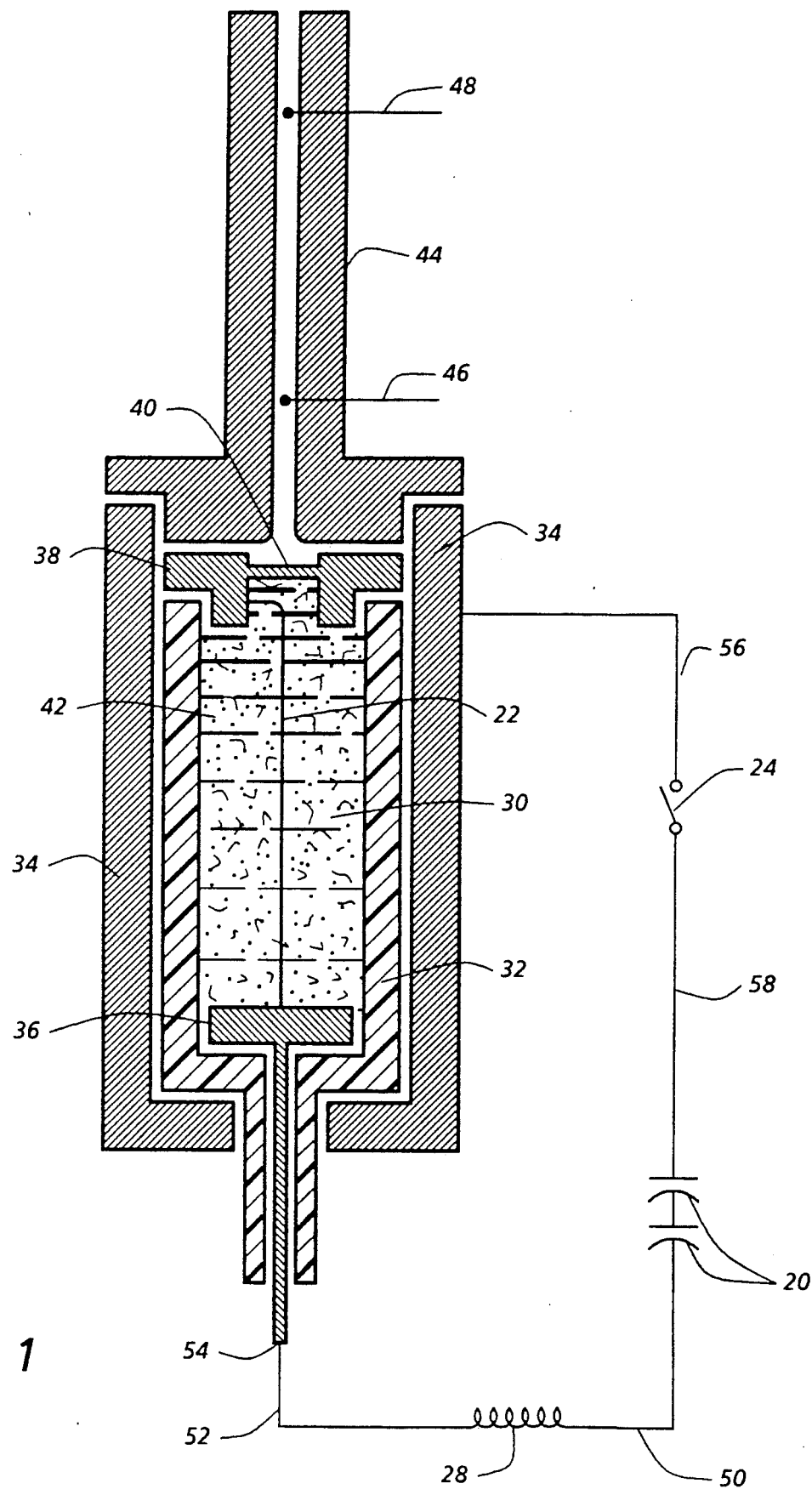
FIG. 1 is a schematic drawing of the test apparatus used to demonstrate the invention.

This invention rapidly generates hydrogen gas in purer form with higher energy efficiency than prior systems. It does this by applying pulse power techniques to a system of a trigger (conductor) wire or wires and an aluminum fuel powder/oxidizer mixture and then using the hydrogen gas to launch projectiles. The aluminum fuels used in this invention are aluminum powder, aluminum-lithium alloy powders, or aluminum-magnesium alloy powders. The most preferred oxidizer is water. The electrical energy in the pulsed form first explodes the trigger wire which initiates the chemical reaction between aluminum powder and water oxidizer. The remaining electrical energy is discharged through the reacting medium to sustain the reaction. The trigger wire can be any conducting metal wire. The aluminum fuel powder in the system undergoes a complete combustion reaction with the oxidizer (water) and high temperature, high pressure hydrogen gas is produced. When such a metallic system is subject to a high power electrical pulse, the complete combustion reaction of the aluminum fuel powder with water is ensured. Additionally, the energy content of the systems is greatly reinforced by the electrical energy. Such enhancement in energy can raise the temperature and pressure of the hydrogen gas to much high value than a chemical reaction alone can provide. Electrically activated combustion of metallic materials also displays some advantageous features such as increase in the reaction rate and controllability of the rate.

The aluminum fuel components are finely powdered aluminum metal, finely powdered aluminum-lithium alloys, and finely powdered aluminum-magnesium alloys. The aluminum, aluminum-lithium alloy, and aluminum-magnesium alloy powders have particles which are preferably 100 micron or less, more preferably 50 microns or less, and still more preferably 20 microns or less in size. Small particle size results in a greater surface area at which the reaction between fuel and oxidizer occurs.

As stated before, the metal fuel materials which are used include aluminum metal powder, aluminum-lithium alloy powders, and aluminum-magnesium alloy powders. The aluminum-lithium alloys contain from more than zero to 3.0, preferably from 2.0 to 3.0, more preferably from 2.0 to 2.8, and still more preferably from 2.5 to 2.8 weight percent of lithium, with the remainder of the alloy consisting essentially of aluminum. As the amount of lithium added to the aluminum is increased, the amount of electrical energy required to cause the complete reaction beween the metal fuel and water is decreased. A minimum of 2.0 percent lithium is used to substantially improve the performance of the Al-Li alloy over aluminum. At least 2.5 percent of lithium is used to produce the best results. The upper limit of lithium is preferably 2.8 weight percent above which Al-Li intermetallic compounds precipitate and the strength of the lithium-aluminum alloys decrease accordingly. If more than 3.0 weight percent of lithium is used, the alloys become too brittle for use in this invention.

Similarly, magnesium may be added to the aluminum to form alloys which require less electrical energy to totally react with water than aluminum alone. Aluminum-magnesium alloys containing from more than zero to 5.0 and more preferably from 3.0 to 4.5 weight weight percent of magesium is used. If more than 5.0 weight percent of magnesium is used, the aluminum-magnesium alloy will be too brittle to be used in this invention.

The most preferred oxidizer is water. Water is nontoxic, noncaustic, nonexplosive, and thermally stable. Moreover, water is stoichimetrically efficient. The oxygen is used up in the oxidation of the aluminum fuel powders and the hydrogen forms low molecular weight propellant gas. The stoichiometric amount of water which will react with the aluminum, aluminum-lithium alloy, or aluminum-magnesium alloy powders is calculated according to the following equations:

$$2\ Al + 6\ H_2O \rightarrow 2\ Al(OH)_3 + 3\ H_2 \quad (1)$$

$$Mg + 2\ H_2O \rightarrow Mg(OH)_2 + H_2 \quad (2)$$

$$2\ Li + 2\ H_2O \rightarrow 2\ LiOH + H_2 \quad (3)$$

Less than 100 percent of the equivalent amount of water will produce a working process. However, it is more preferred that at least 100 percent of the equivalent amount of water is used. Preferably from 50 to 1000, more preferably from 100 to 500, and still more preferably from 150 to 300 percent of the equivalent amount of water is used. As a practical matter, more than 100 percent of the equivalent amount of water is needed to insure that the aluminum fuel particles are in contact with oxidizer during the very fast reaction. However, a large excess of water is undesirable when it adds weight to the device without improving the performance.

For greater energy efficiency it is critical that the aluminum fuel powder is uniformly distributed throughout the water. This can be conveniently done by adding an absorbent ceramic material such as bundles of fine ceramic fibers or ceramic sponges which prevent the separation of the aluminum fuel powder and water. The ceramic materials are light weight, electrically nonconductive, and inert. In other words, they add little weight, do not change the resistance properties, and do not interfere with the chemical reactions of the aluminum fuel powder/water mixture. The ceramic materials also have very high melting points and boiling points. Therefore the ceramic materials will not melt or vaporize during the high temperature reactions. Of the ceramic materials, alumina (mp 2015° C.; bp 2980° C.) is most preferred. An example of these ceramic materials are the fine alumina fiber bundles which are available in sheets or mats under the tradename SAFFIL (alumina fibre mat), manufactured by Imperial Chemical Industries, Ltd., Mond Division, Runcorn, Cheshire, WA74QS, United Kingdom. The fine ceramic fibers or ceramic sponges are thoroughly and uniformly mixed into a slurry of the aluminum fuel powder and water components. The fine ceramic fiber bundles or ceramic sponges absorb the water and aluminum fuel powder particles by capillary action. The fine ceramic fiber bundles (or ceramic sponges) create small spaces in which the aluminum fuel powder and water are held.

This prevents the aluminum fuel powder from settling out of the water.

Using the absorbent ceramic material (e.g., fine fiber bundles or sponges) to take up and hold the water and metal fuel powder mixture is like using Kleenex facial tissue to remove water from a bowl. The tissue absorbs and becomes saturated with the water. When the tissue is removed it takes the water with it. If not enough tissue is used, water remains in the bowl. In the present case, the ideal situation is when all of the aluminum fuel powder/water slurry is absorbed and all of the absorbent ceramic material is saturated. The process, however, will still be operative when more or less than the idea amount of absorbent ceramic material is used. The fine ceramic fibers or ceramic sponges are added in an amount of preferably from about 0.5 to about 3.0, more preferably from 0.5 to 2.0, still more preferably from 0.8 to 1.5 weight percent based on the weight of the dry aluminum fuel powder. Fine fibers are the more preferred form of the ceramic materials. The fibers will preferably have a diameter of less than 20 microns. The length of the fibers is not critical although longer fibers (e.g., 0.25 inches to several inches) are preferred. Other forms of the ceramic materials should be of comparable dimensions.

The reactions of aluminum, lithium, and magnesium with water are initiated and sustained by an electrical discharge through the aluminum fuel (aluminum, aluminumlithium alloy, or aluminum-magnesium alloy powders)/water mixture. This is preferably done by placing the aluminum fuel powder/water mixture in a sealed reaction chamber between two electrodes and passing the current between the electrodes through the mixture. This is facilitated by connecting the electrodes with a conductor wire which passes through the aluminum fuel powder/water mixture. The conductor wire can be made of any electrically conductive material. Preferably a metal such as, gold, silver, iron, nickel, tungsten, steel, magnesium, brass, copper, aluminum or aluminum-lithium alloys may be used. Conductor wires made of an alloy containing from more than zero to 3 weight percent of lithium with the remainder of the alloy being aluminum are more preferred. The weight of the conducting wire is preferably less than 5 percent of the weight of the aluminum fuel powder. Preferably a number of fine conductor wires are used instead of a single large conductor wire. This permits a more uniform placement of conductor wire material throughout the mixture of aluminum fuel powder/water. The total weight of these fine conductor wires is preferably less than 5 percent of the weight of the aluminum fuel powder.

The electrical discharge explodes the conductor wire(s) which in turn provides hot spots of molten material through out the premixed aluminum fuel powder/water mixture. Note that the use of a number of fine conductor wires provides a more uniform distribution of these hot spots throughout the aluminum fuel powder/water mixture. The chemical reaction between the aluminum fuel powders (aluminum powder, aluminum-lithium alloy powders, or aluminum-magnesium alloy powders) and water is first triggered at the hot spots and propagates to the surrounding materials because the reaction is highly exothermic. Therefore most of the aluminum fuel powder is activated by chemical means rather than electrical means. Nonetheless, the provision of the hot spots by the exploding conductor does not necessarily sustain the aluminum fuel powder/water reaction. The sustaining requires a prolonged discharge of the electrical energy through the medium even after the reaction is triggered. The shape of the electrical pulse applied to the medium is not a critical factor for the completion of the reaction as long as it delivers sufficient electrical energy without forming an arcing channel cross the medium.

The electrical discharge parameters are as follows. The total energy of the electrical discharge will preferably be from 0.5 to 15.0 more preferably from 1.0 to 5.0 and still more preferably from 1.8 to 2.2, and most preferably about 2 kilojoules (kJ) per gram (g) of aluminum fuel. Too little electrical energy may result in an incomplete reaction whereas a large excess of energy requires heavier equipment without substantially improving the performance. The length of the electrical discharge is preferably from 10 to 1000, more preferably from 20 to 600, and still more preferably from 40 to 400 microseconds. Too slow a discharge (long discharge time) will result in slower operation of the device and lower pressures and propellant gas velocities. Too fast an electrical discharge (short discharge time) will result in an incomplete chemical reaction between the aluminum fuel powder and water. The apparatus is designed so that preferably from 10 to 30, more preferably from 15 to 25, still more preferably from 18 to 22, and most preferably about 20 percent of the electrical energy is used to explode the conductor wire(s). The remainder the electrical energy is discharged into the reaction mixture to sustain the chemical reaction between the aluminum fuel powder and water after the conductor wire(s) has exploded. Finally, care must be taken to avoid arcing between the electrodes. Arcing is prevented by keeping the voltage drop across the reaction medium under 2 kilvolts per centimeter of distance between the electrodes. For higher voltage drops the electrodes must be farther apart.

The chemical interaction between the aluminum fuel (aluminum powder, aluminum-lithium alloy powders, or aluminum-magnesium alloy powders) and the water it is mixed with depends on the electrical energy discharge through the aluminum fuel powder/water mixture. After the conductor has exploded to initiate the reaction, the voltage drop between the electrodes rapidly rises. An inductive energy store provides an ideal power source for such discharge since its discharge is not limited by the voltage rise across the aluminum fuel/water mixture after the conductor has exploded. For example, a capacitor bank discharge may not discharge all of its stored charge through the metal fuel/water mixture because the voltage rise across the mixture without the conductor wire(s) could exceed the bank voltage thereby terminating the discharge. In addition to the voltage aspect, the power source should also allow a very high current to pass through the conductor wire(s) at the moment of its explosion to deliver a high electrical energy to the metal conductor wire(s) in a very short time.

Discharge of an inductive energy store can fulfill the two conditions mentioned above. The essence of this type of discharge is to transform an electrical energy stored in a battery, electrical rotating (homopolar) generator, capacitor bank, or other primary electrical power source to an energy stored in an inductor and to utilize the inductive energy at the moment of the explosion. For experimental simplicity, a capacitor bank is often used. When a capacitor bank whose energy is $\frac{1}{2} CV^2$ is discharged through a RCL circuit, the primary bank energy is transformed into an inductive energy described by $\frac{1}{2} LI_p^2$ at the time of the peak current. At the peak current time the capacitor bank voltage becomes zero and the current (neglecting energy losses) is given by $I_p = V_c \sqrt{C/L}$. Once the electrical energy is transformed to an inductive energy, the discharge of the inductive energy is not subject to the rise of voltage between the electrodes across the aluminum fuel powder/water mixture.

Figure 2:
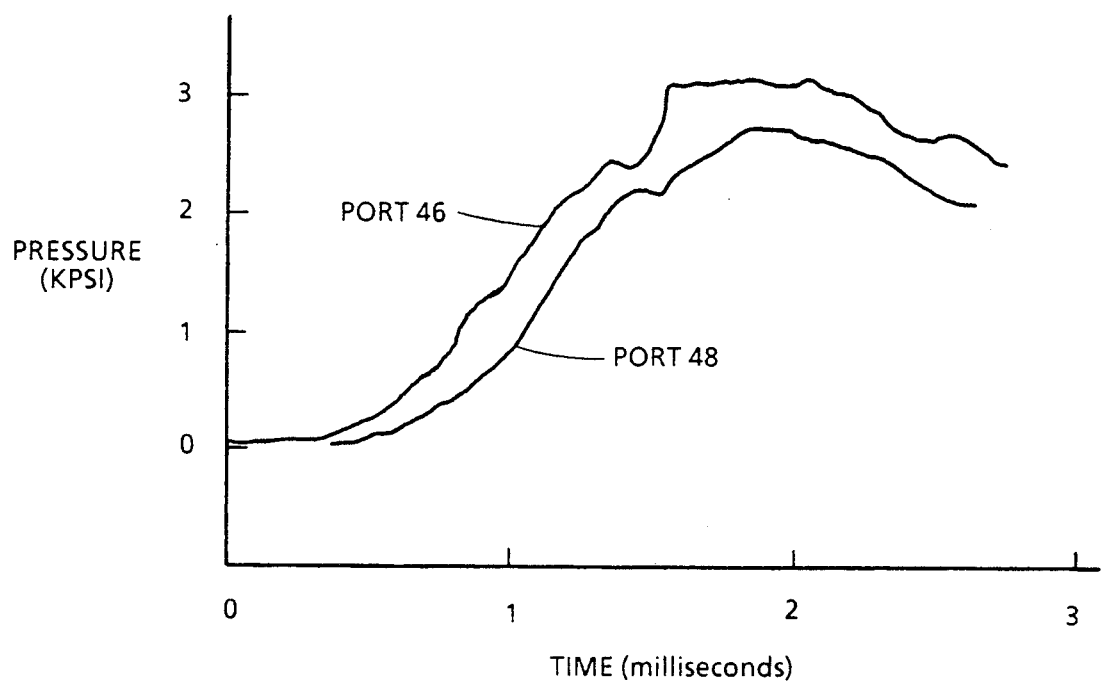
FIG. 2 presents graphs representing the hydrogen gas pressures versus time for an aluminum powder/water system as measured at two pressure gages (transducers) in the barrel of the test apparatus.

FIG. 1 is a schematic drawing representing typical equipment used to demonstrate the present invention. The electric circuit which provides the high energy electrical pulse comprises a capacitor bank 20, a induction coil 28, a metal conductor (wire) 22, and a fast switch 24, all of which are connected in series by electric cables 50, 52, 56, and 58. The metal conductor 22 is placed in the aluminum fuel powder (aluminum powder, aluminum-lithium alloy powder, or aluminum-magnesium powder)/water mixture 30 and both are enclosed in the interior 42 of a cylindrical reaction cartridge 32. The cylindrical reaction cartridge 32 is made of an electrical insulator such as polyethylene. The reaction cartridge 32 is enclosed in a stainless steel chamber 34. A barrel 44 is connected to the top of the steel chamber 34 and completes the enclosure of the reaction cartridge 32. A brass electrode 36 is threaded into the bottom and a second brass electrode 38 is threaded into the top of the reaction cartridge 32. In the center of the top brass electrode 38 is a breakable membrane 40 which separates the interior 42 of the reaction cartridge 32 from the barrel 44. After the reaction has been initiated and a preselected pressure of hydrogen gas has been reached in the reaction cartridge 32 the membrane 40 breaks and the hydrogen gas escapes from the interior 42 of the reaction cartridge 32 into the barrel 44 where it is used to drive a projectile from the barrel 44. For laboratory testing (examples 1 and 2) pressure gages (transducers) 46 and 48 were mounted in the barrel 44 in place of a projectile. FIG. 2 presents pressure readings from these gages (transducers) in example 1.

The series electrical circuit as shown in FIG. 1 can be summarized as follows. The capacitor bank 20 is connected by electric cable 50 to the inductor 28 which is connected by an electrical cable 52 to a high current connection 54 on the brass electrode 36 at the bottom of the reaction cartridge 32. The brass electrode 36 is connected to the other brass electrode 38 at the top of the cartridge 32 by means of the metal conductor 22 which passes through the center of the metal fuel/water mixture 30. The brass electrode 38 at the top of the cartridge 32 is in electrical contact with the stainless steel chamber housing 34 which provides an electrical return path to electrical cable 56 which is connected to one terminal of fast switch 24. The other terminal of the fast switch 24 is connected by electric cable 58 to the capacitor bank 20 thus completing the series circuit.

To more clearly illustrate this invention, the following example is presented. It should be understood, however, that this example is presented merely as a means of illustration and is not intended to limit the scope of this invention in anyway.

Example 1

Aluminum fuel/water

The oxidation reaction of aluminum powder (48 micron diameter) with water was triggered by allowing an electrical current pulse to pass through an aluminum wire embedded in the mixture of the aluminum powder and water. The wire was 6 cm long, 0.84 mm in diameter, and weighed 0.09 gm. The weight of the aluminum powder and water were 1.6 gm and 1.8 gm, respectively. The wire 22 and the mixture 30 were placed in a circuit arrangement as shown in FIG. 1. The capacitor bank 20 had a total capacitance of $6 \times 10^{-4}$ farads and was charged up to 4 kV. Approximately 30% of the stored energy was transformed into inductive energy that was used to explode the wire. The remaining stored energy was dissipated in capacitive discharge mode.

The cartridge 32 was made by drilling a 0.6 cm diameter bore into a polyethylene cylinder of 2.5 cm diameter and 7.5 cm long. The threaded ends of the cartridge were plugged by brass electrodes 36 and 38. The electrode 38 located near the barrel 44 has around the center a thin spot of 0.1 mm thick and 0.4 mm diameter, which functions as a breakable membrane 40 as the pressure inside the cartridge rises.

The cartridge was installed in the steel chamber 34 with the bottom brass electrode 36 in electrical contact to the high current feed through 54 and the other electrode 38 with the breakable membrane 40 connected to inside of the chamber 34 at the point where the barrel 44 is installed. When the predetermined hydrogen pressure is obtained from the reaction the thin breakable membrane 40 in the upper brass electrode 38 breaks providing a path for the hydrogen produced by the reaction to pass from the interior 42 of the reaction cartridge 32 to the barrel 44. Pressure gauges (transducers) 46 and 48 monitored the hydrogen gas pressure along the barrel 44. The hydrogen gas pressure monitored by them is shown in FIG. 2. The hydrogen gas pushing the air column in the barrel attained a velocity of approximately 1 km/sec.

Obviously, numerous modifications and variations of the present invention are possible in light of the above teachings. It is therefore to be understood that within the scope of the appended claims the invention maybe practiced otherwise than as specifically described herein.

What is claimed as new and desired to be secured by Letters Patent of the United States is:

1. A method of propelling a projectile from a device comprising:
    (1) applying a high power pulse of electrical current to a metal conductor causing the metal conductor to explode and thus disperse the metal into a mixture of water and an aluminum fuel powder selected from the group consisting of
    (a) aluminum powder,
    (b) an aluminum-lithium alloy powder comprising from more than zero to 3.0 weight percent lithium with the remainder of the alloy being essentially aluminum, and
    (c) an aluminum-magnesium alloy powder comprising from more than zero to 5.0 weight percent of magnesium with the remainder of the alloy being essentially aluminum,
    wherein the pieces of dispersed metal from the exploded conductor provide hot spots which initiate a chemical reaction between the aluminum fuel and water to generate hydrogen at high pressure in a chamber;
    (2) continuing to supply the high powered pulse of electrical current to drive the reaction between the aluminum fuel and water after the metal conductor has exploded and initiated the reaction;

(3) allowing the hydrogen gas pressure in the chamber to build to a preselected level; and then (4) using the hydrogen gas to push a projectile from the device.

2. The method of claim 1 wherein the aluminum fuel powder is aluminum powder.

3. The method of claim 1 wherein from about 10 to about 30 percent of the total electrical energy is used up in step (1) to explode the metal conductor and the remainder of the electrical energy is used up in step (2) to drive the chemical reaction between the aluminum fuel powder and water.

4. The method of claim 1 wherein the aluminum fuel powder is an aluminum-magnesium alloy powder.

5. The method of claim 4 wherein the aluminum-magnesium alloy powder comprises from 3.0 to 4.5 weight percent magnesium.

6. The method of claim 1 wherein the aluminum fuel powder is an aluminum-lithium alloy powder.

7. The method of claim 6 wherein the aluminum-lithium alloy powder comprises from 2.0 to 2.8 weight percent of lithium.

8. The method of claim 7 wherein the aluminum-lithium alloy powder comprises from 2.5 to 2.8 weight percent of lithium.

9. The method of claim 1 wherein from 50 to 1000 percent of the equivalent amount of water required to oxidize all the aluminum, lithium, and magnesium is used in the reaction mixture.

10. The method of claim 9 wherein from 100 to 500 percent of the equivalent amount of water required to oxidize all the aluminum, lithium, and magnesium is used in the reaction mixture.

11. The method of claim 10 wherein from 150 to 300 percent of the equivalent amount of water required to oxidize all the aluminum, lithium, and magnesium is used in the reaction mixture.

12. The method of claim 1 wherein the pulse of electrical current applied during steps (1) and (2) is from 10 to 1000 microseconds long.

13. The method of claim 12 wherein the pulse of electrical current is from 20 to 600 microseconds long.

14. The method of claim 13 wherein the pulse of electrical current is from 40 to 400 microseconds long.

15. The method of claim 1 wherein the aluminum fuel powder is uniformly distributed throughout the water in the aluminum fuel powder/water mixture by means of an absorbent ceramic material that is electrically nonconductive and chemically inert.

16. The method of claim 15 wherein the absorbent ceramic material is made of alumina.

17. The method of claim 15 wherein the absorbent ceramic material is in the form of sponges.

18. The method of claim 15 wherein the absorbent ceramic material is in the form of bundles of fine ceramic fibers.

19. The method of claim 18 wherein the absorbent ceramic material is in the form of bundles of fine alumina fibers.

20. The method of claim 1 wherein the total energy of the electrical current applied is from 1.0 to 5.0 kilojoules per gram of aluminum fuel powder.

21. The method of claim 20 wherein the total energy of the electrical current applied is from 1.8 to 2.2 kilojoules per gram of aluminum fuel powder.

22. The method of claim 3 wherein from about 15 to about 25 percent of the total electrical energy is used up in step (1) to explode the metal conductor and the remainder of the electrical energy is used up in step (2) to drive the chemical reaction between the aluminum fuel powder and water.

23. The method of claim 22 wherein from 18 to 22 percent of the total electrical energy is used up in step (1) to explode the metal conductor and the remainder of the electrical energy is used up in step (2) to drive the chemical reaction between the aluminum fuel powder and water.

* * * * *